United States Patent
Kott

(10) Patent No.: US 8,972,034 B2
(45) Date of Patent: Mar. 3, 2015

(54) DIAGNOSIS SYSTEM

(75) Inventor: Horst Kott, Munich (DE)

(73) Assignee: Airbus Operations GmbH (DE)

( * ) Notice: Subject to any disclaimer, the term of this patent is extended or adjusted under 35 U.S.C. 154(b) by 426 days.

(21) Appl. No.: 12/738,686

(22) PCT Filed: Nov. 29, 2007

(86) PCT No.: PCT/EP2007/063034
§ 371 (c)(1),
(2), (4) Date: Jul. 6, 2010

(87) PCT Pub. No.: WO2009/068109
PCT Pub. Date: Jun. 4, 2009

(65) Prior Publication Data
US 2010/0268366 A1    Oct. 21, 2010

(51) Int. Cl.
G06F 19/00 (2011.01)
G05B 19/04 (2006.01)
G08B 1/08 (2006.01)
G06F 17/10 (2006.01)
B64F 5/00 (2006.01)

(52) U.S. Cl.
CPC .................................. B64F 5/0009 (2013.01)
USPC . 700/108; 700/255; 340/539.23; 340/539.25; 701/117; 701/301

(58) Field of Classification Search
USPC ........... 700/108, 255; 701/117, 301, 96, 32.3; 340/539.23, 539.25, 686.6, 435, 436, 340/685
See application file for complete search history.

(56) References Cited

U.S. PATENT DOCUMENTS

| | | | | |
|---|---|---|---|---|
| 5,351,916 A | * | 10/1994 | McGonigle et al. | 244/115 |
| 6,081,292 A | * | 6/2000 | Lanigan et al. | 348/61 |
| 6,237,210 B1 | | 5/2001 | Stoewer et al. | |
| 6,294,985 B1 | * | 9/2001 | Simon | 340/435 |
| 6,614,721 B2 | * | 9/2003 | Bokhour | 367/128 |
| 7,202,776 B2 | * | 4/2007 | Breed | 340/435 |
| 2002/0029452 A1 | | 3/2002 | Cappa et al. | |
| 2002/0171739 A1 | * | 11/2002 | Yamada | 348/148 |
| 2003/0043058 A1 | * | 3/2003 | Jamieson et al. | 340/961 |
| 2003/0225479 A1 | * | 12/2003 | Waled | 700/245 |
| 2004/0068341 A1 | | 4/2004 | Minucciani et al. | |

(Continued)

FOREIGN PATENT DOCUMENTS

| GB | 2211318 A | 6/1989 |
|---|---|---|
| GB | 2352692 A | 2/2001 |

(Continued)

OTHER PUBLICATIONS

Bruce A. Smith: "717 final assembly line poised to ride on rails", Aviation Week & Space Technology, vol. 153, No. 18, Oct. 30, 2000,—pp. 56-56, los angeles.

(Continued)

Primary Examiner — Darrin Dunn
(74) Attorney, Agent, or Firm — Lerner, David, Littenberg, Krumholz & Mentlik, LLP

(57) ABSTRACT

According to an exemplary embodiment of the present invention, a diagnosis system for detecting a state of emergency during assembly of a fuselage (101) of an airplane is provided, which is adapted for detecting an emergency event and outputting information relating to the actual position of the emergency event. This may provide for a fast error identification during airplane assembly.

10 Claims, 2 Drawing Sheets

(56) References Cited

U.S. PATENT DOCUMENTS

| | | |
|---|---|---|
| 2004/0162651 A1 | 8/2004 | Halm et al. |
| 2005/0172470 A1* | 8/2005 | Cobb et al. ................... 29/407.1 |
| 2005/0187712 A1* | 8/2005 | Callaghan et al. ............ 701/301 |
| 2006/0285937 A1* | 12/2006 | Wobben ........................... 410/45 |
| 2007/0268155 A1* | 11/2007 | Holmes et al. ................. 340/901 |
| 2008/0125896 A1* | 5/2008 | Troy et al. ..................... 700/110 |
| 2009/0083100 A1* | 3/2009 | Darby et al. ....................... 705/7 |
| 2009/0106988 A1* | 4/2009 | Cobb ............................ 33/1 BB |

FOREIGN PATENT DOCUMENTS

| | | |
|---|---|---|
| JP | 01153387 A | 6/1989 |
| JP | 2000126952 A | 5/2000 |
| JP | 2001129730 A | 5/2001 |
| JP | 2007121307 A | 5/2007 |
| RU | 2233011 C2 | 9/2002 |

OTHER PUBLICATIONS

Boeing UK: "Feb. 13, 2005—The new weapon in Airbus rivalry: speed", Boeing 737 Production Boeing 737 Production, Mar. 24, 2013, Apr. 17, 2013' UK Retrieved from the Internet: URL:http://www.b737.org.uklproduction.htm <http://www.b737.org.uklproduction.htm/>[retrieved on Apr. 17, 2013].

* cited by examiner

DIAGNOSIS SYSTEM

CROSS-REFERENCE TO RELATED APPLICATIONS

This application is a national phase entry under 35 U.S.C. §371 of International Application No. PCT/EP2007/063034, filed Nov. 29, 2007, published in English, the disclosure of which application is hereby incorporated by referenced herein.

The present invention relates to the field of airplane assembling. In particular, the present invention relates to a diagnosis system for detecting a state of emergency during assembly of a fuselage of an airplane, to a method for detecting a state of emergency, a computer-readable medium, a data processing unit and a program element.

In order to assemble an airplane, the fuselage of the airplane has to be moved from its construction site to the final assembling place, which may be located in a different construction site. This is a difficult process which may give reason to damages of the fuselage.

It is an object of the present invention to provide for an improved assembling of a fuselage of an airplane.

According to an exemplary embodiment of the present invention, a diagnosis system for detecting a state of emergency during assembly of a fuselage of an airplane is provided, the diagnosis system comprising a detection unit for detecting a state of emergency when the fuselage is in a first assembly state, and an output unit for outputting position information to a user when the state of emergency is detected, wherein the position information relates to a local position at which the state of emergency is detected.

Therefore, according to this exemplary embodiment of the present invention, the diagnosis system may for example be adapted for monitoring the status of the fuselage and its surroundings. If a positioning error or another case of emergency is detected by the detection unit, an error signal is output. The error signal comprises localisation information relating to the position of the emergency event.

In order to avoid damage of the huge fuselage, moving of the fuselage may be performed step by step. After each step, a clearance signal or release signal may be generated, in order to unblock the diagnosis system so that it can move the fuselage to the next position.

However, in case no clearance signal is generated after a certain movement step, or in case an emergency signal has been generated, the position, at which the state of emergency has been detected, has to be found in order to be able to check whether this is a new emergency situation or a false alarm. According to an aspect of the present invention, the local position of the emergency event can be located without loss of time.

It should be noted, that the term "moving of a fuselage" refers to a movement of the fuselage as a whole, but also to a movement of a (future) part of the fuselage or a movement of a construction unit such as a platform. The term "assembly state" refers to a particular status of the airplane during construction, comprising a position of the fuselage or the wing.

According to another exemplary embodiment of the present invention, the diagnosis system is adapted for preventing a movement of the fuselage from a first position to a second position when the state of emergency is detected.

Therefore, according to this exemplary embodiment of the present invention, the diagnosis system is blocked in case of emergency detection, such that the reason of the error warning can be removed.

According to another exemplary embodiment of the present invention, the diagnosis system is adapted for preventing an assembling of the fuselage (101) from the first assembly state to a second assembly state when the state of emergency is detected.

According to another exemplary embodiment of the present invention, the state of emergency corresponds to a local difference between a target state and an actual state of the diagnosis system and the fuselage.

For example, the target state is stored in a calculation unit and compared to the detected actual state of the diagnosis system and the fuselage.

According to another exemplary embodiment of the present invention, the detection unit comprises a detector, wherein the detector is adapted as an optical sensor, a pressure sensor or a switch.

The switch may be manually operated, for example, by a user. The optical sensor may be a light barrier, a photo sensor or a laser, thereby providing an accurate and fast position detection. The pressure sensor, for example, may, for example, be installed in a place, where there is a risk of a collision of the fuselage with other equipment.

According to another exemplary embodiment of the present invention, the output unit is adapted for indicating, to the user, the position at which the state of emergency is detected by marking the position on a graphical representation of the target state.

For example, according to this exemplary embodiment of the present invention, the graphical representation of the target state is a schematic representation of the target state or a photograph of the target state, comprising different sections of the construction site, such as switches or other detector elements, which have to be in a specific (target) state. Such elements are marked, for example, by certain colours or errors on the output unit screen.

According to another exemplary embodiment of the present invention, the diagnosis system is adapted for moving a wing of an airplane from the first position to the second position.

Therefore, according to this exemplary embodiment of the present invention, not only a fuselage may be moved from the diagnosis system, but also a wing or other heavy object.

Thus, the diagnosis system may always the be used, when a big object, such as a fuselage or a wing of an airplane, has to be moved from a first position to a second position.

According to another exemplary embodiment of the present invention, outputting the position information and preventing the movement of the fuselage from the first position to the second position is performed automatically.

Therefore, according to this exemplary embodiment of the present invention, user interaction is not necessary.

According to another exemplary embodiment of the present invention, a method for detecting a state of emergency during assembly of a fuselage of an airplane is provided, the method comprising the steps of detecting a state of emergency when the fuselage is in a first assembly state and outputting position information to a user when the state of emergency is detected, wherein the position information relates to a local position at which the state of emergency is detected.

This may provide for a safe and effective method of detecting, outputting and localising emergency events.

According to another exemplary embodiment of the present invention, the method further comprises the step of preventing a movement of the fuselage from a first position to a second position when the state of emergency is detected.

Thus, the diagnosis system may be blocked in case of emergency, thereby preventing damage of the fuselage.

According to another exemplary embodiment of the present invention, the method further comprises the step of preventing an assembling of the fuselage (101) from the first assembly state to a second assembly state when the state of emergency is detected.

Beyond this, according to another exemplary embodiment of the present invention, a computer-readable medium may be provided, in which a computer program for detecting a state of emergency during assembly of a fuselage of an airplane is stored which, when being executed by a processor, causes the processor to carry out the above-mentioned method steps.

Furthermore, according to another exemplary embodiment of the present invention, a program element for detecting a state of emergency during assembly of a fuselage of an airplane is provided, which, when being executed by a processor, causes the processor to carry out the above-mentioned method steps.

Furthermore, according to another exemplary embodiment of the present invention, a data processing unit for detecting a state of emergency during assembly of a fuselage of an airplane is provided, adapted to carry out the above-mentioned method steps.

Those skilled in the art will readily appreciate that the method of moving the fuselage of an airplane from a first position to a second position may be embodied as the computer program, i.e. by software, or may be embodied using one or more special electronic optimization circuits, i.e. in hardware, or the method may be embodied in hybrid form, i.e. by means of software components and hardware components.

The program element according to an exemplary embodiment of the present invention may preferably be loaded into working memories of a data processor. The data processor may thus be equipped to carry out exemplary embodiments of the methods of the present invention. The computer program may be written in any suitable programming language, such as, for example, C++ and may be stored on a computer-readable medium, such as a CD-ROM. Also, the computer program may be available from a network, such as the WorldWideWeb, from which it may be downloaded into image processing units or processors, or any suitable computers.

These and other aspects of the present invention will become apparent from and elucidated with reference to the embodiments described hereinafter.

Exemplary embodiments of the present invention will be described in the following, with reference to the following drawings.

The illustration in the drawings is schematically. In different drawings, similar or identical elements are provided with the same reference numerals.

Figure 1:
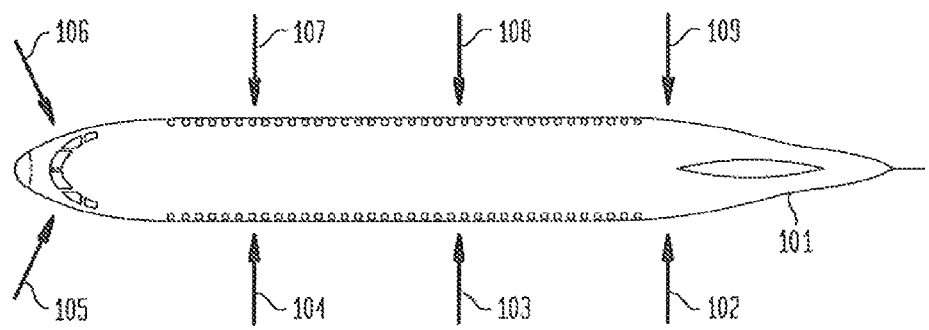
FIG. 1 shows a schematic representation of a fuselage with markers according to an exemplary embodiment of the present invention.
Figure 4:
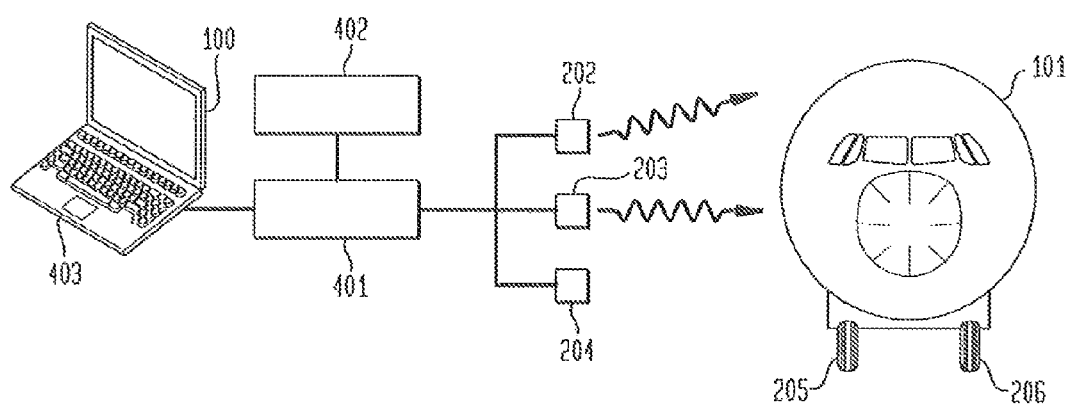
FIG. 4 shows an exemplary embodiment of a diagnosis system comprising a computer system according to the present invention, for executing an exemplary embodiment of a method in accordance with the present invention.

FIG. 1 shows a schematic representation of a fuselage 101 with markers 102, 103, 104, 105, 106, 107, 108 and 109 according to an exemplary embodiment of the present invention. The fuselage 101, together with markers 102 to 109, may be depicted on the screen of an output unit 100 (which is shown in FIG. 4).

In case of an emergency event, which takes place, for example, at the position of arrow 105, arrow 105 is highlighted on the output screen or switches colours (for example, from green to red).

It should be noted, however, that other types of representation may be implemented in order to indicate the position of an emergency event. For example, the coordinate of the invention may be output or a picture of the place of the emergency event may be shown on the screen, thereby indicating to the user to which place the emergency event relates.

Therefore, a user is able to quickly determine where such a failure has occurred and which steps have to be taken in order to be able to continue with the positioning procedure.

After having localised the error or emergency event, the obstacle is removed or the failure repaired, or other steps are taken in order to remove the error source.

After that, the diagnosis system is unblocked and the fuselage can be moved from the actual position to the next position.

Figure 2:
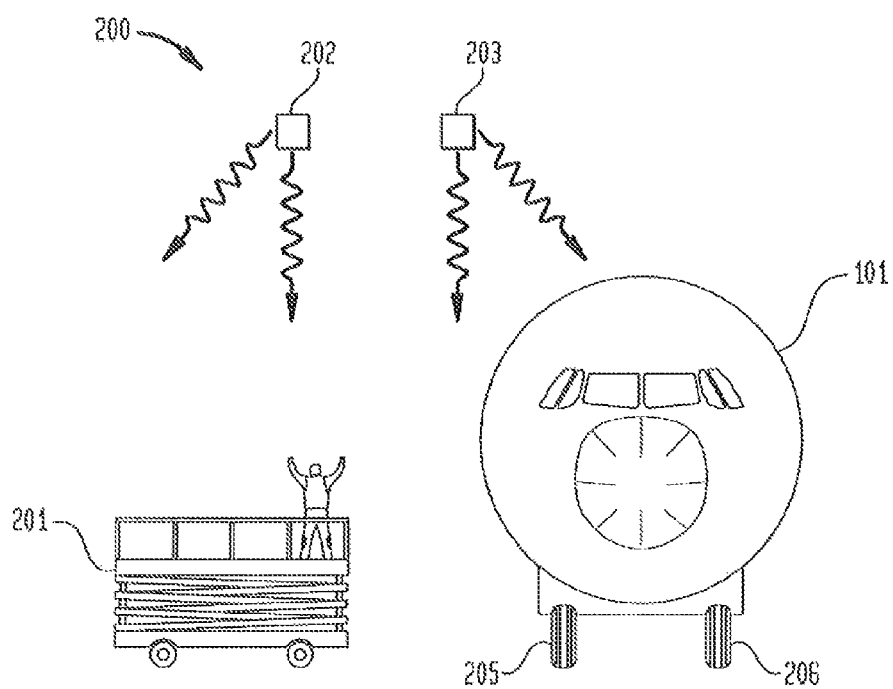
FIG. 2 shows a schematic representation of a diagnosis system according to an exemplary embodiment of the present invention.

FIG. 2 shows a schematic representation of a diagnosis system 200 according to an exemplary embodiment of the present invention. As may be seen from FIG. 2, the diagnosis system 200 comprises a construction platform 201 and several detectors 202, 203.

The first detector 202 is adapted for monitoring the position and movement of the construction platform 201. The second detector 203 is adapted for monitoring the position and movement of the fuselage 101. Both detectors, 202, 203 are linked to the output unit 100 (not depicted in FIG. 2). In case one of the detector units 202, 203 detects an emergency event, a corresponding emergency signal is transmitted to the output unit, for example, via a wireless communication link.

Such an emergency event is then represented, together with the position information, on the screen of the output unit 100.

The fuselage 101 is moved by means of positioning units 205, 206.

Figure 3:
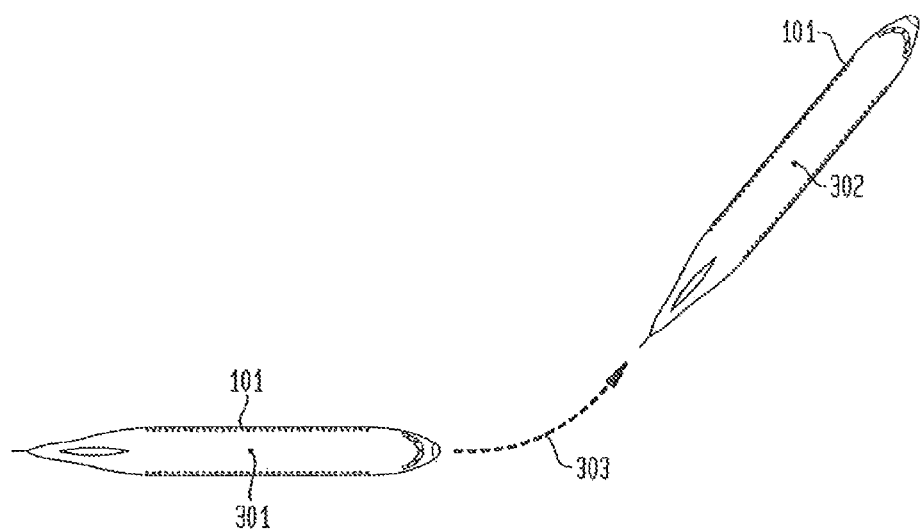
FIG. 3 shows positioning of a fuselage.

FIG. 3 shows the positioning of a fuselage 101 from a first position 301 to a second position 302 along positioning track 303. If an error is detected when the fuselage 101 is in the first position 301, the diagnosis system is blocked and the location of the error event is indicated on a display 100.

FIG. 4 shows an exemplary embodiment of a diagnosis system according to an exemplary embodiment of the present invention. The diagnosis system comprises positioning units 205, 206, adapted for moving the fuselage 101 from a first position to a second position. Furthermore, the system comprises a plurality of detectors, 202, 203, 204, which are adapted for detecting an emergency event (or error) and for detecting the actual position of the emergency event (or error).

The detectors 202, 203, 204 are linked to a computer processor 401 which is adapted for processing the emergency information. The processor 401 is further connected to a computer-readable medium 402, in which a computer program is stored, enabling the processor to carry out the above-mentioned method steps.

Furthermore, an output unit 100 and an input unit 403 are connected to the processor 401 for outputting and inputting information, respectively.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An airplane assembly and diagnosis system detecting a state of emergency during assembly of a fuselage of an airplane, the system comprising:
   a movable construction platform;
   a positioning unit configured to move the fuselage of the airplane;
   a first detection unit configured to monitor a position and a movement of the fuselage;
   a second detection unit configured to monitor a position and a movement of the construction platform, the first and second detection units configured to detect at least one of a first state of emergency for the fuselage and a second state of emergency for the construction platform when the fuselage is in a first assembly state, the first state of emergency corresponding to a first local difference between an actual position of the fuselage and a calculated target state of the fuselage along a positioning track, the second state of emergency corresponding to a second local difference between an actual position of the construction platform and a calculated target state of the construction platform; and
   an output unit configured to indicate to a user at least one of a first position and a second position at which at least one of the first state of emergency and the second state of emergency, respectively, is detected by marking the position on a graphical representation of the corresponding target states of the diagnosis system and the fuselage, the graphical representation further comprising a fuselage schematic including a plurality of markers spaced apart along the fuselage schematic periphery, the graphical representation indicating a position in which a state of emergency is detected;
   wherein the position information relates to at least one of a local position at the fuselage or a local position at the construction platform at which the state of emergency is detected;
   wherein the system is configured to prevent a movement of the fuselage from a first position to a second position when at least one of the first and second states of emergency is detected, thereby preventing damage to the fuselage; and
   wherein the system is further configured to be unblocked such that the fuselage can be moved to a next position after a source of the at least one of the first and second states of emergency has been removed.

2. The system of claim 1,
   wherein the diagnosis system is adapted for preventing an assembling of the fuselage from the first assembly state to a second assembly state when at least one of the first and second states of emergency is detected.

3. The system of claim 1,
   wherein the detection unit comprises a detector;
   wherein the detector is selected from the group consisting of an optical sensor, a pressure sensor, and a switch.

4. The system of claim 3,
   wherein the detector comprises a photo sensor or a laser.

5. The system of claim 1,
   wherein the diagnosis system is adapted for moving a wing of an airplane from the first position to the second position.

6. The system of claim 1,
   wherein outputting the position information and preventing the movement of the fuselage from the first position to the second position is performed automatically.

7. A method for detecting a state of emergency during assembly of a fuselage of an airplane, the method comprising:
   moving the fuselage of the airplane;
   monitoring a position and a movement of the fuselage along a positioning track;
   monitoring a position and a movement of a construction platform;
   detecting at least one of a first state of emergency for the fuselage and a second state of emergency for the construction platform when the fuselage is in a first assembly state, the first state of emergency corresponding to a first local difference between an actual position of the fuselage and a calculated target state of the fuselage along the positioning track and the second state of emergency corresponding to a second local difference between an actual position of the construction platform and a calculated target state of the construction platform;
   when at least one of the first and second states of emergency is detected, indicating to a user a position at which the state of emergency is detected by marking the position on a graphical representation of a target state of the diagnosis system and the fuselage, the graphical representation comprising a fuselage schematic including a plurality of markers spaced apart along the fuselage schematic periphery, the graphical representation indicating a position in which a state of emergency is detected;
   preventing a movement of the fuselage from a first position to a second position when the state of emergency is detected; and
   moving the fuselage to a next position after a source of the state of emergency has been removed;
   wherein the position information relates to a local position at the fuselage at which the state of emergency is detected, thereby preventing damage to the fuselage.

8. The method of claim 7, further comprising:
   preventing an assembling of the fuselage from the first assembly state to a second assembly state when at least one of the first and second states of emergency is detected.

9. A non-transitory computer-readable medium, having stored thereon instructions for detecting a state of emergency during assembly of a fuselage of an airplane, that, when executed by a processor, causes the processor to perform the following steps:
   monitoring a position and a movement of the fuselage and a position and a movement of a construction platform;
   monitoring a position and a movement of the fuselage along a positioning track;
   monitoring a position and a movement of a construction platform;
   detecting at least one of a first state of emergency for the fuselage and a second state of emergency for the construction platform when the fuselage has been moved and is now in a first assembly state, the first state of emergency corresponding to a first local difference between an actual position of the fuselage and a calculated target state of the fuselage along the positioning track and the second state of emergency corresponding to a second local difference between an actual position of the construction platform and a calculated target state of the construction platform;
   when at least one of the first and second states of emergency is detected, indicating to a user a position at which the state of emergency is detected by marking the position on a graphical representation of a target state of the diagnosis system and the fuselage, the graphical representation comprising a fuselage schematic including a plurality of markers spaced apart along the fuselage schematic periphery, the graphical representation indicating a position in which a state of emergency is detected;

preventing a movement of the fuselage from a first position to a second position when the state of emergency is detected; and moving the fuselage to a next position after a source of the state of emergency has been removed;

wherein the position information relates to a local position at the fuselage at which the state of emergency is detected, thereby preventing damage to the fuselage.

10. A data processing unit for detecting a state of emergency during assembly of a fuselage of an airplane, the data processing unit comprising:

a memory for storing a target state of the fuselage;

a processor adapted for:

monitoring a position and a movement of the fuselage along a positioning track;

monitoring a position and a movement of a construction platform;

detecting at least one of a first state of emergency for the fuselage and a second state of emergency for the construction platform when the fuselage has been moved and is now in a first assembly state, the first state of emergency corresponding to a first local difference between an actual position of the fuselage and a calculated target state of the fuselage along the positioning track and the second state of emergency corresponding to a second local difference between an actual position of the construction platform and a calculated target state of the construction platform;

when at least one of the first and second states of emergency is detected, indicating to a user a position at which the state of emergency is detected by marking the position on a graphical representation of a target state of the diagnosis system and the fuselage, the graphical representation comprising a fuselage schematic including a plurality of markers spaced apart along the fuselage schematic periphery, the graphical representation indicating a position in which a state of emergency is detected;

preventing a movement of the fuselage from a first position to a second position when a state of emergency is detected; and moving the fuselage to a next position after a source of the state of emergency has been removed;

wherein the position information relates to a local position at the fuselage at which the state of emergency is detected, thereby preventing damage to the fuselage.

* * * * *